(12) United States Patent
Magnuson et al.

(10) Patent No.: US 11,277,573 B2
(45) Date of Patent: Mar. 15, 2022

(54) SYSTEMS AND METHODS FOR MONITORING DRILL STRINGS

(71) Applicant: Nabors Drilling Technologies USA, Inc., Houston, TX (US)

(72) Inventors: Christopher Magnuson, Houston, TX (US); Mark Docherty, Houston, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 113 days.

(21) Appl. No.: 16/704,080

(22) Filed: Dec. 5, 2019

(65) Prior Publication Data

US 2020/0186726 A1 Jun. 11, 2020

Related U.S. Application Data

(60) Provisional application No. 62/776,751, filed on Dec. 7, 2018.

(51) Int. Cl.
| | | |
|---|---|---|
| *H04N 5/247* | (2006.01) | |
| *G06T 7/00* | (2017.01) | |
| *H04N 7/18* | (2006.01) | |
| *E21B 41/00* | (2006.01) | |

(52) U.S. Cl.
CPC ............. *H04N 5/247* (2013.01); *E21B 41/00* (2013.01); *G06T 7/001* (2013.01); *H04N 7/18* (2013.01)

(58) Field of Classification Search
CPC .......... H04N 5/247; H04N 7/18; G06T 7/001; E21B 41/00
USPC ........................................................ 348/129
See application file for complete search history.

(56) References Cited

U.S. PATENT DOCUMENTS

| | | | |
|---|---|---|---|
| 4,715,442 A | 12/1987 | Kahil et al. | |
| 8,065,937 B2 | 11/2011 | Halse | |
| 9,354,623 B2 | 5/2016 | Magnuson | |
| 10,087,745 B2 | 10/2018 | Gottlieb et al. | |
| 2003/0118230 A1 | 6/2003 | Song et al. | |
| 2009/0192731 A1* | 7/2009 | De Jesus ............. | G01M 5/0025 702/42 |
| 2011/0308332 A1 | 12/2011 | Blessum et al. | |
| 2013/0340998 A1 | 12/2013 | Flusche | |
| 2018/0340998 A1 | 11/2018 | Ye | |

FOREIGN PATENT DOCUMENTS

| | | |
|---|---|---|
| CN | 102052981 A | 5/2011 |
| CN | 106548469 A | 3/2017 |
| WO | 2018093273 A1 | 5/2018 |

\* cited by examiner

*Primary Examiner* — On S Mung

(74) *Attorney, Agent, or Firm* — Abel Schillinger, LLP; Enrique Abarca

(57) ABSTRACT

A system for monitoring a drill string comprising: a plurality of image capture devices disposed around a wellbore and adapted to record images of a portion of the drill string; and a logic device adapted to determine linearity of the portion of the drill string based on a form factor deviation. A method of monitoring a drill string comprising: capturing images of a portion of the drill string with an image capture device; assessing a form factor deviation of the portion of the drill string; and determining a linearity of the portion of the drill string based on the form factor deviation.

20 Claims, 4 Drawing Sheets

SYSTEMS AND METHODS FOR MONITORING DRILL STRINGS

CROSS-REFERENCE TO RELATED APPLICATION(S)

This application claims priority under 35 U.S.C. § 119(e) to U.S. Patent Application No. 62/776,751, entitled "SYSTEMS AND METHODS FOR MONITORING DRILL STRINGS," by Christopher MAGNUSON and Mark DOCHERTY, filed Dec. 7, 2018, which application is assigned to the current assignee hereof and incorporated herein by reference in its entirety.

FIELD OF THE DISCLOSURE

The present disclosure relates to systems and methods for monitoring drill strings, and more particularly to systems and methods for monitoring linearity of at least portions of a drill string.

RELATED ART

Drilling subterranean formations for oil and gas involves the use of a drilling rig adapted to rotatably bias a drill string into a wellbore. In certain instances, drilling is performed over land. In other instances, drilling is performed over water. As the drill string is biased into the wellbore, it can be subjected to various loading forces. These forces can be caused by axial pressure, lateral loading, and combinations thereof.

During tripping operations, drill string segments are successively removed from or added to the drill string to alter the length of the drill string. Drill string segments can include singular drill pipes or drill stands including multiple interconnected drill pipes. These drill string segments can be stored, for instance in a racking board (sometimes referred to as a monkey board) when not actively engaged in the drill string.

Due to the high forces exhibited on the drill string segments, they can become deformed—such as bent, during use. Reusing bent drill string segments in the drill string can result in premature failure of one or more drill string segments. This failure is often manifest in a broken drill string, requiring drill operators to fish for the broken drill string segment within the wellbore. Such operations are costly and waste significant drilling time.

The drilling industry continues to demand improvements in drilling technology. In particular, the drilling industry demands a way to prevent drill string failure caused by deformed drill string segments.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
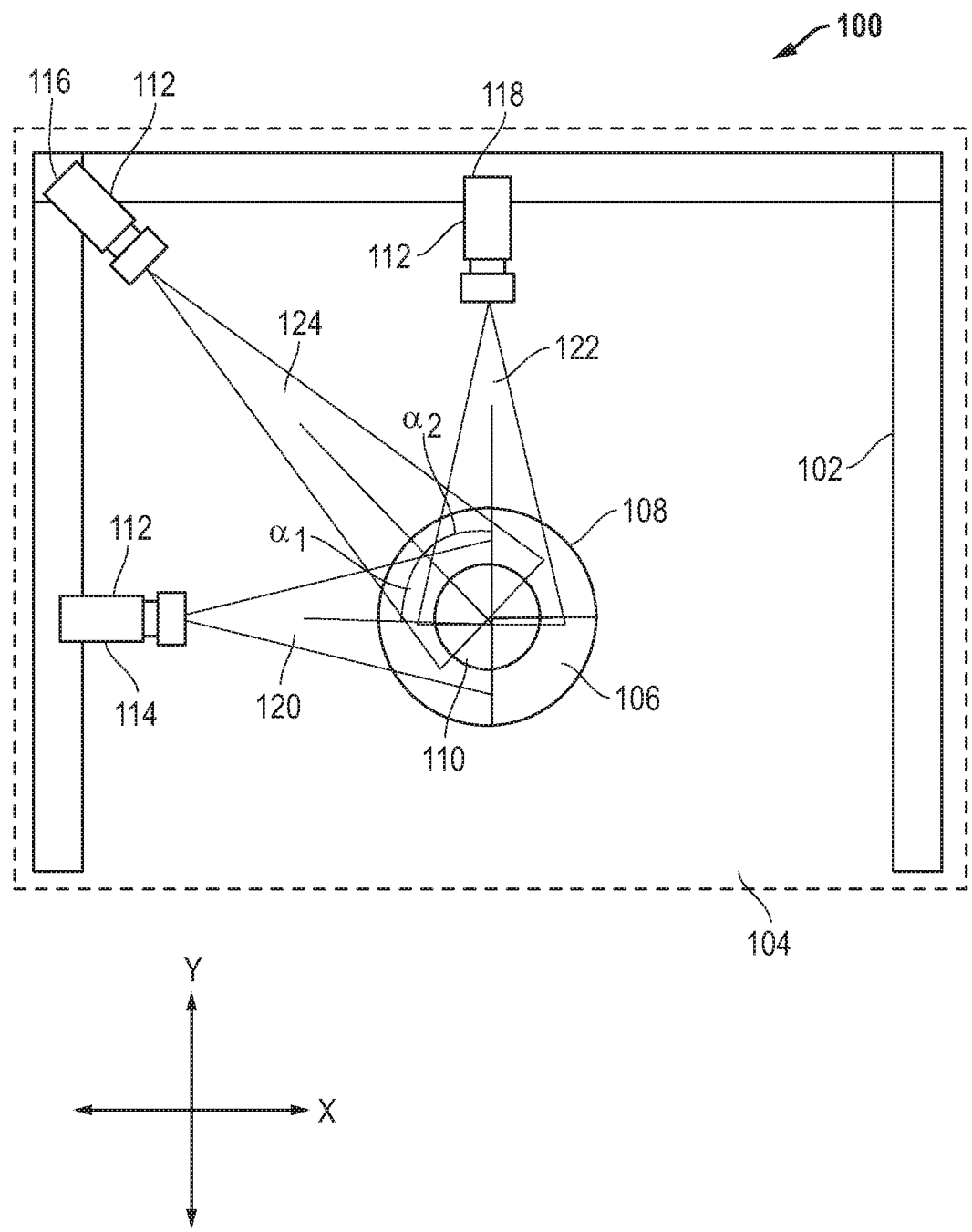
FIG. 1 includes a schematic top view of a drilling rig in accordance with an embodiment.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, "generally equal," "generally same," and the like refer to deviations of no greater than 10%, or no greater than 8%, or no greater than 6%, or no greater than 4%, or no greater than 2% of a chosen value. For more than two values, the deviation can be measured with respect to a central value. For example, "generally equal" refer to two or more conditions that are no greater than 10% different in value. Demonstratively, angles offset from one another by 98% are generally perpendicular.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the drilling arts.

In accordance with an aspect described herein, a system for monitoring a drill string can include a plurality of image capture devices adapted to record images of a portion of the drill string and a logic device adapted to determine linearity of the portion of the drill string based on a form factor deviation determined from the recorded images. The plurality of image capture devices can be disposed around a wellbore receiving the drill string. In an embodiment, the logic device is adapted to assess the form factor deviation by determining an ideal linearity profile of the portion of the drill string and calculating a ratio of the portion of the drill string within the ideal linearity profile to the portion of the drill string outside of the ideal linearity profile. In an embodiment, the logic device can be adapted to generate an alert when the linearity of the portion of the drill string is outside of a prescribed range.

In certain instances, determining the ideal linearity profile can include determining an upper area of the portion of the drill string, determining a lower area of the portion of the drill string, and determining a best fit line between the upper area of the portion of the drill string and the lower area of the portion of the drill string. Ideal linearity profile can be determined from the images recorded by the image capture devices.

In an embodiment, the portion of the drill string being recorded by the image capture devices can correspond to a finite number of drill pipe segments. In a more particular embodiment, the portion of the drill string can correspond with one drill pipe segment. In another more particular embodiment, the portion of the drill string can correspond with a drill stand comprised of a plurality of drill pipe segments. In yet another more particular embodiment, the portion of the drill string can correspond with the drill string. That is, the portion of the drill string can include the entire drill string.

In an embodiment, the plurality of image capture devices can include at least two image capture devices or at least three image capture devices. The plurality of image capture devices can include, for instance, a first image capture device, a second image capture device, and a third image capture device. The first and second image capture devices can be spaced apart from one another by a same angle as the second and third image capture devices. In certain instances, the image capture devices are angularly spaced apart from one another so as to permit three-dimensional analysis of the portion of the drill string.

In an embodiment, the image capture devices can be disposed at a vertical elevation above the portion of the drill string. In an embodiment, the image capture devices can have a field of view with a center line angled below wellbore position. The center line can be offset from the wellbore by at least 5°, at least 10°, at least 15°, at least 20°, at least 25°, at least 30°, at least 35°, or at least 40°. In an embodiment, the plurality of image capture devices can be offset from one another in a range of 10° and 90°, in a range of 15° and 45°, or in a range of 20° and 25°. In a particular embodiment, at least two of the plurality of image capture devices can be angularly offset from one another by approximately 22.5°.

In accordance with another aspect, a method of monitoring a drill string can include capturing images of a portion of the drill string with an image capture device, assessing a form factor deviation of the portion of the drill string, and determining linearity of the portion of the drill string based on the form factor deviation. In an embodiment, assessing the form factor can include determining an ideal linearity profile of the portion of the drill string and calculating a ratio of the portion of the drill string within the ideal linearity profile to the portion of the drill string outside of the ideal linearity profile. In a particular embodiment, calculating the ratio of the portion of the drill string within the ideal linearity profile comprises assessing a number of pixels within the ideal linearity profile and a number of pixels outside of the ideal linearity profile. The number of pixels within the ideal linearity profile can be compared to the number of pixels outside of the ideal linearity profile. When the form factor is outside of a prescribed range, a logic element can generate an alert.

FIG. 1 illustrates a schematic top view of a drilling rig 100 including a mast 102 disposed above a drill rig floor 104. A wellbore 106 can extend through a subterranean formation disposed below the drill rig floor 104. An opening 108 within the drill rig floor 104 can allow for communication of a drill string 110 extending into the wellbore 106 with components and tools—such as top drives, rotary tables, gripping arms, etc., of the drilling rig 100. It should be noted that the illustrations are intentionally simplified. Many other components and tools may be employed during the various periods of formation and preparation of the wellbore. Moreover, some components and tools may be omitted during various periods of formation and preparation of the wellbore. Similarly, as will be appreciated by those skilled in the art, the orientation and environment of the wellbore may vary widely depending upon the location and situation of the formations of interest. For example, rather than a generally vertical bore, the wellbore, in practice, may include one or more deviations, including angled and horizontal runs. Similarly, while shown as a surface (land-based) operation, the wellbore may be formed in water of various depths, in which case the topside equipment may include an anchored or floating platform.

The drilling rig 100 can include a plurality of image capture devices 112. The image capture devices 112 can be disposed on the drilling rig 100 and adapted to record images of at least a portion of the drill string 110. In an embodiment, the plurality of image capture devices 112 can include at least two image capture devices, at least three image capture devices, at least four image capture devices, or at least five image capture devices. In another embodiment, the plurality of image capture devices 112 can include no greater than fifty image capture devices, no greater than twenty image capture devices, or no greater than ten image capture devices. In an embodiment, the plurality of image capture devices 112 can be in electronic communication with one another or a common logic element, such as a microprocessor. In another embodiment, at least one of the plurality of image capture devices 112 can be electrically isolated from at least one other of the plurality of image capture devices 112.

The plurality of image capture devices 112 can include, for instance, a first image capture device 114, a second image capture device 116, and a third image capture device 118. In an embodiment, the first and second image capture devices 114 and 116 can be angularly spaced apart from one another by a same, or generally same, angle as the second and third image capture devices 116 and 118. In an embodiment, at least one of the plurality of image capture devices 112 can be redundant. For instance, the second image capture device 116 can be adapted for use in situations where one of the first and third image capture devices 114 or 118 fails. In other instances, the first, second, and third image capture devices 114, 116, and 118 can be used in concert with one another, even when all of the plurality of image capture devices 112 are functional.

In an embodiment, the plurality of image capture devices 112 can be spaced apart from one another so as to permit three-dimensional analysis of the portion of the drill string 110. The image capture devices 112 can be arranged to capture images of the portion of the drill string 110 so as to permit analysis of the portion of the drill string 110 for linearity. In an embodiment, the first and second image capture devices 114 and 116 can be angularly spaced apart from one another by an angle, $\alpha_1$, in a range of 10° and 90°, in a range of 15° and 45°, or in a range of 20° and 25°. In a more particular embodiment, the first and second image capture devices 114 and 116 can be angularly spaced apart from one another by an angle, $\alpha_1$, of approximately 22.5°. In another embodiment, the second and third image capture devices 116 and 118 can be angularly spaced apart from one another by an angle, $\alpha_2$, in a range of 10° and 90°, in a range of 15° and 45°, or in a range of 20° and 25°. In a more particular embodiment, the second and third image capture devices 116 and 118 can be angularly spaced apart from one another by an angle, $\alpha_2$, of approximately 22.5°. In certain instances, the first and second angles, $\alpha_1$ and $\alpha_2$, can be within +/−20° of one another, +/−15° of one another, +/−10° of one another, or +/−5° of one another. In a more particular instance, the first and second angles, $\alpha_1$ and $\alpha_2$, can be approximately equal to one another. In yet a more particular instance, the first and second angles, $\alpha_1$ and $\alpha_2$, can be equal to one another.

In a particular embodiment, the first image capture device 114 can be oriented with respect to the drilling rig 100 such that a center line of the field of view 120 of the first image capture device 114 is along a plane defined by an X-axis of an X-, Y-, Z-field. In a more particular embodiment, the third image capture device 118 can be oriented with respect to the drilling rig 100 such that a center line of the field of view 122 of the third image capture device 118 is along a plane defined by a Y-axis of the X-, Y-, Z-field. The second image capture device 116 can have a field of view 124 oriented along a plane defined by a combination of the X- and Y-axis.

Figure 2:
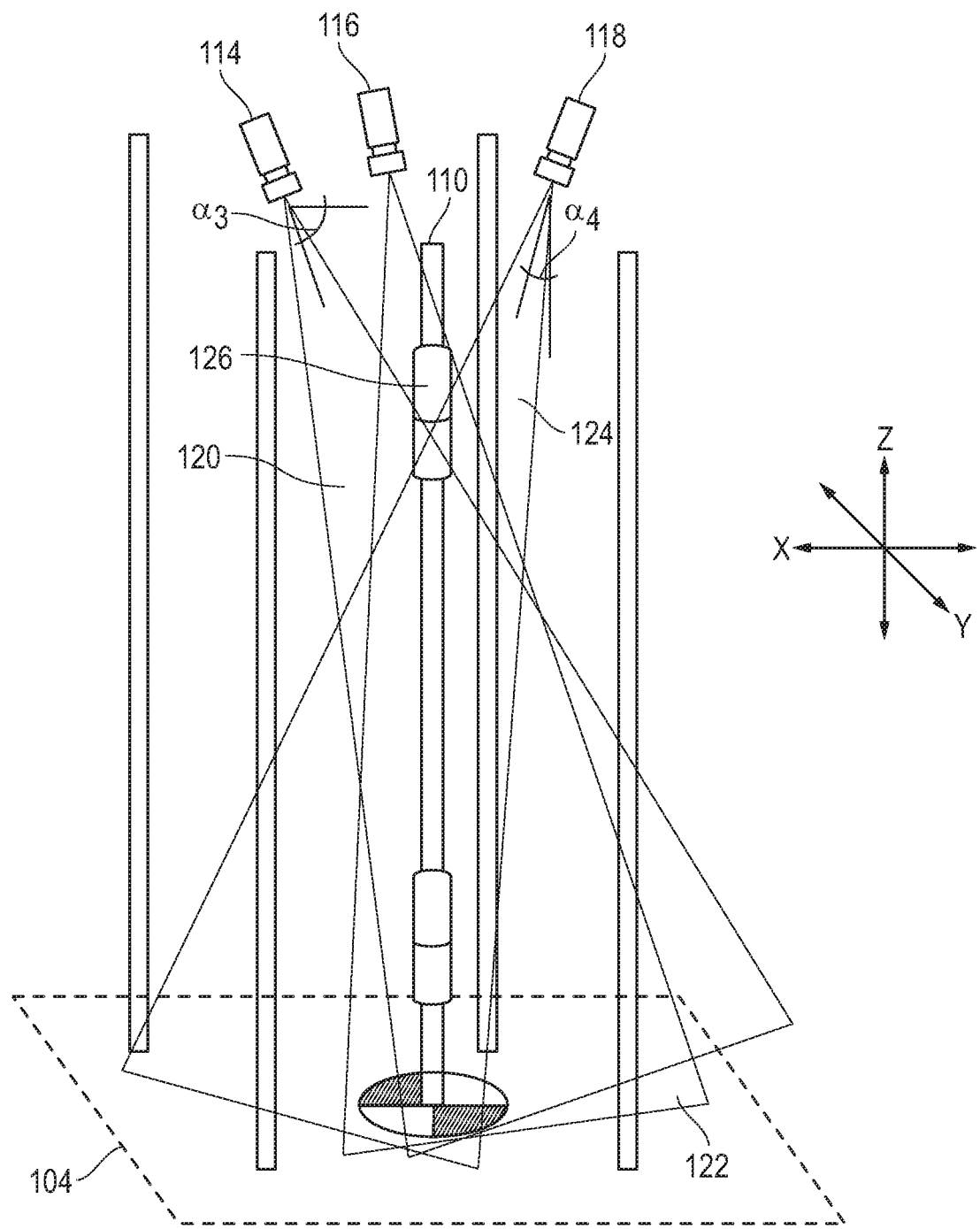
FIG. 2 includes a schematic perspective side view of the drilling rig in accordance with an embodiment.

Referring to FIG. 2 and in accordance with an embodiment, at least one of the plurality of image capture devices 112 can have a field of view 120, 122, or 124 with a center line angled downward along the Z-axis, e.g., toward the rig floor 104. In a particular embodiment, the at least one image capture device 112 can include all of the plurality of image capture devices 112. In an embodiment, the portion of the drill string 110 captured by the image capture device 112 can correspond with part of the drill string disposed above the surface of the subterranean formation. In yet a more particular embodiment, the portion of the drill string 110 can correspond with part of the drill string disposed above the rig floor 104, such as at least part of a drill string stump.

In an embodiment, at least one of the plurality of image capture devices 112 can be disposed at a vertical elevation above the rig floor 104. In a more particular embodiment, at least one of the plurality of image capture devices 112 can be disposed at a vertical elevation above at least part of the portion of the drill string 110 being observed. In yet a more particular embodiment, at least one of the plurality of image capture devices 112 can be disposed at a vertical elevation above the entire portion of the drill string 110 being observed. In such a manner, at least one of the plurality of image capture devices 112 can capture an image of the entire length of the portion of the drill string 110. In a particular instance, all of the plurality of image capture devices 112 can be disposed at a same, or generally same, vertical elevation, as measured with respect to the rig floor 104. In another instance, at least one of the plurality of image capture devices 112 can be vertically offset from the other image capture devices 112. In an embodiment, at least one of the plurality of image capture devices 112 can be coupled with the mast 102. In a more particular embodiment, all of the plurality of image capture devices 112 can be coupled with the mast 102. In another embodiment, at least one of the plurality of image capture devices 112 can be coupled with a non-mast component of the drilling rig 100. For instance, the at least one image capture device 112 can be coupled with the top drive, an arm or gripper, another drilling rig tool, a stand-alone support structure, or any combination thereof. In an embodiment, at least one of the plurality of image capture devices 112 can be statically positioned such that the image capture device 112 remains at a relatively fixed location with respect to the wellbore 106. In a more particular embodiment, the center line of the field of view 120, 122, or 124 of the at least one image capture device 112 can be relatively fixed with respect to the wellbore 106. In a more particular embodiment, the center line of the fields of view 120, 122, and 124 of all the image capture devices 112 can be relatively fixed with respect to the wellbore 106.

In an embodiment, the plurality of image capture devices 112 can have fields of view 120, 122, and 124 with center lines angled below wellbore position. For instance, the center line of at least one of the fields of view 120, 122, or 124 can be angled, $\alpha_3$, with respect to horizontal (e.g., the X-, Y-plane) by at least 5°, at least 10°, at least 15°, at least 20°, at least 25°, at least 30°, at least 35°, or at least 40°. In a more particular embodiment, $\alpha_3$ can be at least 45°, at least 50°, at least 55°, at least 60°, or at least 70°. In an embodiment, the center line of at least one of the fields of view 120, 122, or 124 can be angularly offset from the Z-axis by an angle, $\alpha_4$, of at least 1°, at least 2°, at least 3°, at least 4°, at least 5°, or at least 10°.

In an embodiment, at least one of the image capture devices 112 can be adapted for continuous image capturing. For instance, the at least one image capture device 112 can be adapted to continuously capture a sequence of images which can be combined to form a video image of the portion of the drill string 110. By way of non-limiting example, the image capture devices 112 can include video cameras and other optical and visual capturing equipment and sensors. In certain instances, continuous capture can be performed after a user requests image capture. In other instances, continuous capture can be performed after a signal is received by the image capture device 112 from a sensor, detector, logic element, or other component adapted to notify the image capture device 112 upon occurrence of a condition. For instance, the drilling rig 100 can include a sensor adapted to detect the relative position of the portion of the drill string 110. By way of non-limiting example, the sensor may be adapted to monitor the location of drill string joints (e.g., joint 126). After a predefined number of joints 126 pass the field of view for the sensor, the logic element can send a signal to the image capture device 112 to initiate image capture. In other embodiments, capturing the images can be performed upon occurrence of a condition, the condition selected from passage of the portion of the drill string past a particular location, passage of a joint of the drill string past a detector or location, sensor detection of the portion of the drill string at a prescribed location, or any combination thereof.

In another embodiment, at least one of the image capture devices 112 can be adapted for single image capture. For example, the at least one image capture device 112 can include a camera, a digital camera, or another non-continuous image capture device. In certain instances, image capture can be performed after a user request. In other instance, image capture can be performed after a signal is received by the image capture device 112 from a sensor, detector, logic element, or other component adapted to notify the image capture device 112 upon occurrence of a condition.

In an embodiment, all of the image capture devices 112 can include a same type of image capture device. For instance, all of the image capture devices 112 can be adapted for continuous image capturing. In a more particular embodiment, at least two, such as all, of the image capture devices 112 can be adapted to capture images at a same frequency. For instance, the at least two image capture devices 112 can be adapted to capture images at a rate of at least 0.1 frame per second (FPS), at least 1 FPS, at least 2 FPS, at least 3 FPS, at least 4 FPS, at least 5 FPS, at least 10 FPS, at least 30 FPS, or at least 60 FPS. In other instances, at least one of the image capture devices can be adapted to capture images at a rate of at least 0.1 frame per second (FPS), at least 1 FPS, at least 2 FPS, at least 3 FPS, at least 4 FPS, at least 5 FPS, at least 10 FPS, at least 30 FPS, or at least 60 FPS. In an embodiment, the image capture devices 112 can be synchronized with one another to permit simultaneous image capture. In another embodiment, at least one of the image capture devices 112 can be adapted to capture images at a different time than another image capture device 112.

In an embodiment, the portion of the drill string 110 being captured by the image capture devices 112 can include a finite number of drill pipe segments. In a more particular embodiment, the finite number of drill pipe segments can correspond with one drill pipe segment (e.g., a pipe segment having a length of approximately 30 feet). In another particular embodiment, the finite number of drill pipe segments can correspond with a drill stand (e.g., a plurality of successively coupled pipe segments). In yet another particular embodiment, the finite number of drill pipe segments can correspond with the drill string 110, such as the entire drill string 110.

Figure 3:
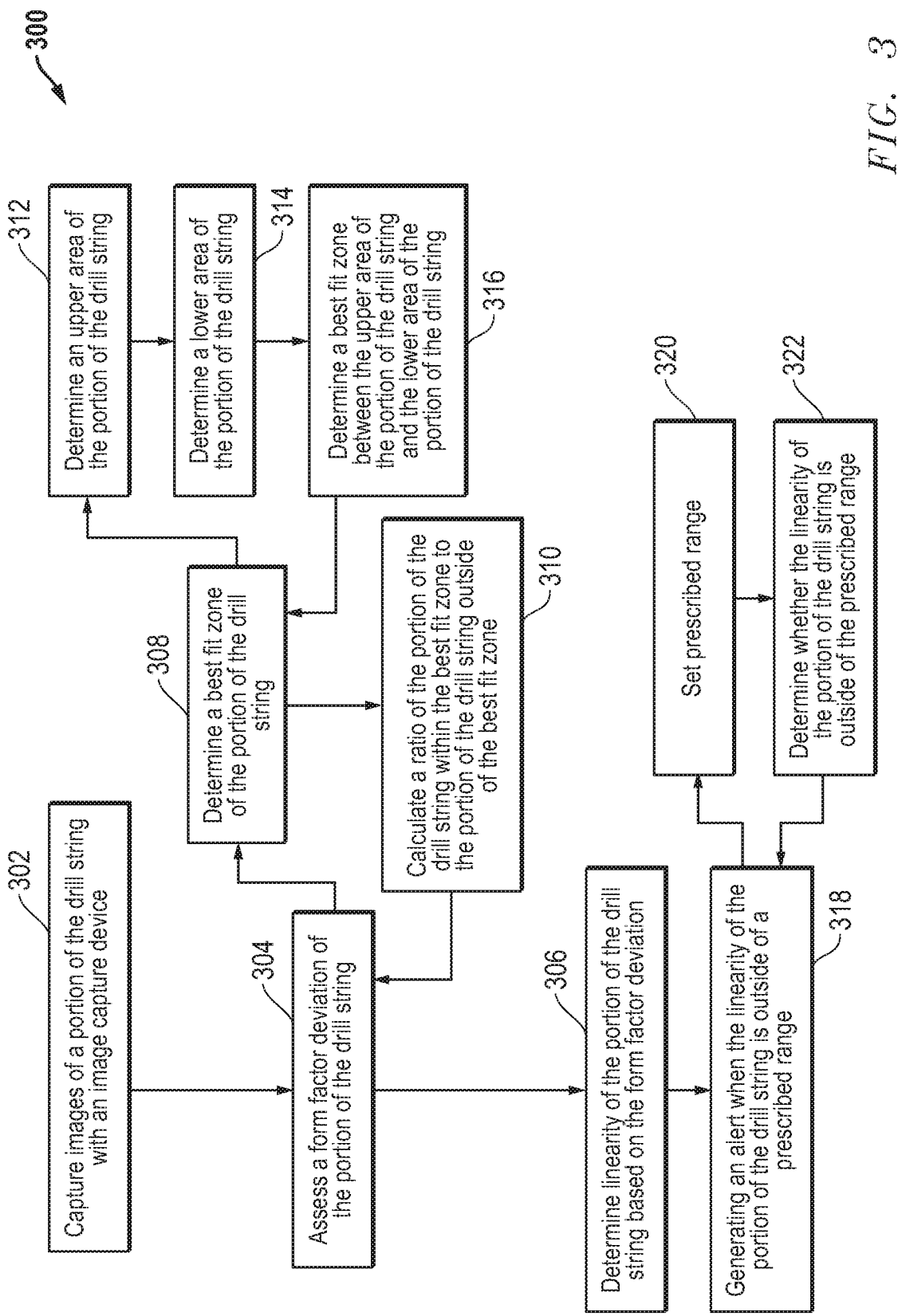
FIG. 3 includes an exemplary flow chart of a method of monitoring a drill string in accordance with an embodiment.

FIG. 3 illustrates an exemplary method 300 of monitoring a drill string in accordance with an embodiment. The method 300 can include capturing 302 images of a portion of the drill string with an image capture device, assessing 304 a form factor deviation of the portion of the drill string, and determining 306 linearity of the portion of the drill string based on the form factor deviation.

In an embodiment, assessing 304 the form factor deviation can include determining 308 an ideal linearity profile of the portion of the drill string and calculating 310 a ratio of the portion of the drill string within the ideal linearity profile to the portion of the drill string outside of the ideal linearity profile. In an embodiment, assessing 304 the form factor deviation of the portion of the drill string can be performed by a logic element, including for instance, a microprocessor. The logic element can be part of software and hardware disposed on the drilling rig, remotely, or both.

Figure 4:
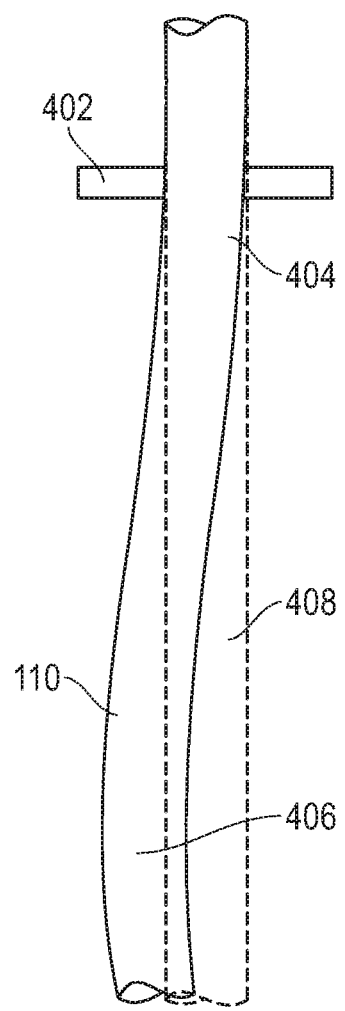
FIG. 4 includes a simplified side view of a portion of a deformed drill string as compared to an ideal linearity profile of the portion of the drill string in accordance with an embodiment.

FIG. 4 includes a simplified view of a portion of a drill string 110 supported by a drill rig component 402 being observed by the first image capture device 114. Referring to FIGS. 3 and 4, in an embodiment, determining 308 the ideal linearity profile of the portion of the drill string 110 can include determining 312 an upper area 402 of the portion of the drill string 110. Determining 312 the upper area can include locating an upper feature of the portion of the drill string 110, such as an upper center of mass of the portion of the drill string 110, one or more upper outer edges of the portion of the drill string 110, an upper joint or collar of the portion of the drill string 110, another upper location of the portion of the drill string 110, or any combination thereof. Determining 308 the ideal linearity profile can further include determining 314 a lower area 406 of the portion of the drill string 110. Determining 314 the lower area 406 can include locating a lower feature of the portion of the drill string 110, such as a lower center of mass of the portion of the drill string 110, one or more lower outer edges of the portion of the drill string 110, a lower joint or collar of the portion of the drill string 100, another lower location of the portion of the drill string 110, or any combination thereof. Determining 308 the ideal linearity profile can further include determining 316 an ideal fit from the upper and lower areas, such as determining a best fit zone 408 between the upper area 404 of the portion of the drill string 110 and the lower area 406 of the portion of the drill string 110. The volume contained within the best fit zone 408 can correspond with the ideal fitting drill pipe segment, as measured under known operating conditions. In certain instances, the best fit zone 408 can correspond with an exact fit of an ideal fitting drill pipe segment. In other instances, the best fit zone 408 can correspond with a volume bigger than the ideal fitting drill pipe segment, such as 101% the volume of the ideal fitting drill pipe segment, 105% the volume of the ideal fitting drill pipe segment, or 110% the volume of the ideal fitting drill pipe segment.

In an embodiment, calculating 310 the ratio of the portion of the drill string 110 within the best fit zone 408 to the portion of the drill string 110 outside of the best fit zone 408 can include assessing a volume of the portion of the drill string 110 disposed within the best fit zone 408 and a volume of the portion of the drill string 110 disposed outside of the best fit zone 408. In a more particular embodiment, calculating 310 the ratio of the portion of the drill string 110 within the best fit zone 408 to the portion of the drill string 110 outside of the best fit zone 408 can include assessing a number of pixels associated with the portion of the drill string 110 disposed within the best fit zone 408 and a number of pixels outside of the best fit zone 408.

In certain instances, the method 300 can further include generating 318 an alert when the linearity of the portion of the drill 110 string is outside of a prescribed range. Generating 318 the alert can be performed by setting 320 a prescribed range and determining 322 whether the linearity of the portion of the drill string 110 is outside of the prescribed range. In certain instances, the prescribed range for alert generation can be affected by a drilling operator or standard protocol. After the portion of the drill string is outside of the prescribed range, the portion of the drill string can be removed from the other segments for further inspection, decommissioning, or repair. In certain instances, the removal of the portion of the drill string can occur autonomously. That is, for example, a logic element can be adapted to signal to one or more tools or components associated with the drilling rig 100, or a tool or component in service thereto, that the portion of the drill string outside of the prescribed range of linearity is to be removed from the other segments. In another instance, the removal of the portion of the drill string can occur through human interaction. For example, the logic element can signal to a drill operator that the portion of the drill string being examined is outside of the prescribed range, upon which the drill operator can instruct a human, tool, or equipment to remove the portion of the drill string. Tripping, casing, or other operations being performed during assessment of linearity can continue during or after removal of the damaged portion of drill string from the segments of drill string to be used in the wellbore 106.

In certain instances, at least part of the method 300 can be performed at a remote location spaced apart from the drilling rig 100 (FIG. 1). For instance, in an embodiment, the captured images can be transmitted to a remote location for assessment of form factor. By way of non-limiting example, the captured images can be transmitted through wired or wireless protocol to a remote location for access. In another embodiment, the captured images can be stored, for instance on a memory device, for later assessment of form factor.

Embodiment 1

A system for monitoring a drill string comprising:
a plurality of image capture devices disposed around a wellbore and adapted to record images of a portion of the drill string; and
a logic device adapted to determine linearity of the portion of the drill string based on a form factor deviation.

Embodiment 2

The system of embodiment 1, wherein assessing the form factor deviation comprises:
determining a best fit zone of the portion of the drill string, and
calculating a ratio of the portion of the drill string within the best fit zone to the portion of the drill string outside of the best fit zone.

Embodiment 3

The system of embodiment 1, wherein the logic device is adapted to generate an alert when the linearity of the portion of the drill string is outside of a prescribed range.

Embodiment 4

The system of embodiment 1, wherein the portion of the drill string corresponds to a finite number of drill pipe segments.

Embodiment 5

The system of embodiment 4, wherein the finite number of drill pipe segments comprises one drill pipe.

Embodiment 6

The system of embodiment 4, wherein the finite number of dill pipe segments comprises a drill stand.

Embodiment 7

The system of embodiment 4, wherein the finite number of drill pipe segments comprises a drill string.

Embodiment 8

The system of embodiment 1, wherein the plurality of image capture devices comprises at least two image capture devices, or at least three image capture devices.

Embodiment 9

The system of embodiment 1, wherein the plurality of image capture devices comprises a first image capture device, a second image capture device, and a third image capture device, and wherein the first and second image capture devices are spaced apart from one another by a same angle as the second and third image capture devices.

Embodiment 10

The system of embodiment 1, wherein the plurality of image capture devices are angularly spaced apart from one another to permit three-dimensional analysis of the portion of the drill string.

Embodiment 11

A system for monitoring a drill string comprising:
a plurality of image capture devices disposed around a wellbore and adapted to capture images of a portion of the drill string, wherein at least two of the plurality of image capture devices are adapted to capture the entire portion of the drill string in a single image; and
a logic device adapted to determine linearity of the portion of the drill string in view of images captured by at least some of the image capture devices.

Embodiment 12

The system of embodiment 11, wherein the plurality of image capture devices comprises at least three image capture devices.

Embodiment 13

The system of embodiment 11, wherein the plurality of image capture devices have a field of view with a center line angled below wellbore position.

Embodiment 14

The system of embodiment 13, wherein the center line angled with respect to horizontal by at least 5°, at least 10°, at least 15°, at least 20°, at least 25°, at least 30°, at least 35°, or at least 40°.

Embodiment 15

The system of embodiment 11, wherein the at least two of the plurality of image capture devices are angularly spaced apart from one another in a range of 10° and 90°, in a range of 15° and 45°, or in a range of 20° and 25°.

Embodiment 16

The system of embodiment 11, wherein the at least two of the plurality of image capture devices are angularly spaced apart from one another by approximately 22.5°.

Embodiment 17

The system of embodiment 11, wherein the plurality of image capture devices are disposed at a vertical elevation above the portion of the drill string.

Embodiment 18

A method of monitoring a drill string comprising:
capturing images of a portion of the drill string with an image capture device;
assessing a form factor deviation of the portion of the drill string; and
determining a linearity of the portion of the drill string based on the form factor deviation.

Embodiment 19

The method of embodiment 17, wherein assessing the form factor deviation comprises:
determining a best fit zone of the portion of the drill string, and
calculating a ratio of the portion of the drill string within the best fit zone to the portion of the drill string outside of the best fit zone.

Embodiment 20

The method of embodiment 18, wherein determining the best fit zone comprises:
  determining an upper area of the portion of the drill string;
  determining a lower area of the portion of the drill string;
  determining the best fit zone between the upper area of the portion of the drill string and the lower area of the portion of the drill string.

Embodiment 21

The method of embodiment 20, wherein determining the best fit zone comprises determining a volume in which an ideal fitting drill pipe segment would occupy.

Embodiment 22

The method of embodiment 21, wherein calculating a ratio of the portion of the drill string within the best fit zone to the portion of the drill string outside the best fit zone comprises assessing a number of pixels within the best fit zone and a number of pixels outside of the best fit zone.

Embodiment 23

The method of embodiment 18, further comprising generating an alert when the linearity of the portion of the drill string is outside of a prescribed range.

Embodiment 24

The method of embodiment 18, wherein capturing the images is performed automatically.

Embodiment 25

The method of embodiment 18, wherein capturing the images is performed at a rate of at least 0.1 frame per second (FPS), at least 1 FPS, at least 2 FPS, at least 3 FPS, at least 4 FPS, at least 5 FPS, at least 10 FPS, at least 30 FPS, or at least 60 FPS.

Embodiment 26

The method of embodiment 18, wherein capturing the images is performed upon occurrence of a condition, the condition selected from passage of the portion of the drill string past a particular location, passage of a joint of the drill string past a detector or location, sensor detection of the portion of the drill string at a prescribed location, or any combination thereof.

Embodiment 27

The method of embodiment 18, further comprising storing the captured image of the portion of the drill string for later assessment of form factor.

Embodiment 28

The method of embodiment 18, further comprising transmitting the captured image of the portion of the drill string to a remote location for assessment of form factor.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A system for monitoring a drill string comprising:
  a plurality of image capture devices disposed around a wellbore and adapted to record images of a portion of the drill string; and
  a logic device adapted to:
    determine an ideal linearity profile of the portion of the drill string, wherein the ideal linearity profile is a profile of a drill pipe segment prior to an occurrence of any damage to the drill pipe segment;
    calculate a ratio of the portion of the drill string within the ideal linearity profile to the portion of the drill string outside of the ideal linearity profile, wherein the ratio is a form factor deviation; and
    determine linearity of the portion of the drill string based on the form factor deviation.

2. The system of claim 1, wherein the logic device is further adapted to:
  locate an upper feature of the portion of the drill string;
  locate a lower feature of the portion of the drill string;
  determine a best fit zone, which comprises a best fit between a volume of the ideal linearity profile and a volume of the portion of the drill string between the upper feature and the lower feature; and
  calculate the form factor deviation.

3. The system of claim 1, wherein the logic device is adapted to generate an alert when the linearity of the portion of the drill string is outside of a prescribed range.

4. The system of claim 1, wherein the portion of the drill string corresponds to a finite number of drill pipe segments wherein the finite number of drill pipe segments comprises a drill pipe segment, or a drill stand, or a drill string.

5. The system of claim 1, wherein the plurality of image capture devices are angularly spaced apart from one another to permit three-dimensional analysis of the portion of the drill string.

6. A system for monitoring a drill string comprising:
a plurality of image capture devices disposed around a wellbore and adapted to capture images of a portion of the drill string, wherein at least two of the plurality of image capture devices are adapted to capture an entire portion of the drill string in a single image; and
a logic device adapted to determine linearity of the portion of the drill string in view of images captured by at least some of the image capture devices.

7. The system of claim 6, wherein the plurality of image capture devices comprises at least three image capture devices.

8. The system of claim 6, wherein the plurality of image capture devices have a field of view with a center line angled below wellbore position.

9. The system of claim 8, wherein the center line angled with respect to horizontal by at least 5°.

10. The system of claim 6, wherein the at least two of the plurality of image capture devices are angularly spaced apart from one another in a range of 10° and 90°.

11. The system of claim 6, wherein the at least two of the plurality of image capture devices are angularly spaced apart from one another by approximately 22.5°.

12. A method of monitoring a drill string comprising:
capturing images of a portion of the drill string with an image capture device;
determining an ideal linearity profile of the portion of the drill string, wherein the ideal linearity profile is a profile of a drill pipe segment prior to an occurrence of any damage to the drill pipe segment;
calculating a ratio of the portion of the drill string that is within the ideal linearity profile to the portion of the drill string that is outside of the ideal linearity profile, wherein the ratio is a form factor deviation;
assessing the form factor deviation of the portion of the drill string; and
determining a linearity of the portion of the drill string based on the form factor deviation.

13. The method of claim 12, wherein assessing the form factor deviation comprises:
determining a best fit zone of the portion of the drill string, wherein the best fit zone is defined as a best fit between a volume of the ideal linearity profile and a volume of the portion of the drill string, and
calculating the ratio of the portion of the drill string that is within the best fit zone to the portion of the drill string that is outside of the best fit zone.

14. The method of claim 13, wherein determining the best fit zone comprises:
determining an upper area of the portion of the drill string;
determining a lower area of the portion of the drill string;
determining the best fit zone between the upper area of the portion of the drill string and the lower area of the portion of the drill string.

15. The method of claim 14, the volume of the ideal linearity profile is a volume in which an ideal fitting drill pipe segment would occupy.

16. The method of claim 15, wherein calculating the ratio of the portion of the drill string comprises assessing a number of pixels that are within the best fit zone and a number of pixels that are outside of the best fit zone based on the captured images and the ideal linearity profile.

17. The method of claim 12, further comprising generating an alert when the linearity of the portion of the drill string is outside of a prescribed range.

18. The method of claim 12, wherein capturing the images is performed automatically.

19. The method of claim 12, wherein capturing the images is performed at a rate of at least 0.1 frame per second (FPS).

20. The method of claim 12, wherein capturing the images is performed upon occurrence of a condition, the condition selected from passage of the portion of the drill string past a particular location, passage of a joint of the drill string past a detector or location, sensor detection of the portion of the drill string at a prescribed location, or any combination thereof.

* * * * *